United States Patent [19]
Manev et al.

[11] Patent Number: 6,040,089
[45] Date of Patent: Mar. 21, 2000

[54] MULTIPLE-DOPED OXIDE CATHODE MATERIAL FOR SECONDARY LITHIUM AND LITHIUM-ION BATTERIES

[75] Inventors: Vesselin Manev; Titus Faulkner, both of Gastonia; Wayne Barnette, Bessemer City, all of N.C.; Yuan Gao, Ocean, N.J.

[73] Assignee: FMC Corporation, Philadelphia, Pa.

[21] Appl. No.: 09/031,849

[22] Filed: Feb. 27, 1998

Related U.S. Application Data

[60] Provisional application No. 60/039,666, Feb. 28, 1997.

[51] Int. Cl.$^7$ ............................................. H01M 4/50
[52] U.S. Cl. ................. 429/231.1; 429/224; 429/231.3
[58] Field of Search .............................. 429/224, 231.1, 429/231.3; 252/519.15, 519.12; 423/599, 598, 594

[56] References Cited

U.S. PATENT DOCUMENTS

| | | |
|---|---|---|
| 4,366,215 | 12/1982 | Coetzer et al. . |
| 4,507,371 | 3/1985 | Thackeray et al. . |
| 4,668,595 | 5/1987 | Yoshino et al. . |
| 4,749,634 | 6/1988 | Sammells . |
| 4,980,251 | 12/1990 | Thackeray et al. . |

(List continued on next page.)

FOREIGN PATENT DOCUMENTS

| | | | |
|---|---|---|---|
| 0 712 172 | 5/1996 | European Pat. Off. . | |
| 0 744 381 | 11/1996 | European Pat. Off. | ........ C01G 45/00 |
| 44 35 117 | 5/1996 | Germany . | |
| 6124707 | 5/1994 | Japan . | |
| 2 270 195 | 3/1994 | United Kingdom . | |
| WO 96/34423 | 4/1996 | WIPO . | |

OTHER PUBLICATIONS

Hernan et al., Solid State Ionics, vol. 118, pp. 179–185. (No month available) 1999.

de Kock et al., J. Power Sources, vol. 70, pp. 247–252. (No month available) 1998.

Amine et al., J. Power Sources, vol. 68, pp. 604–608. (No month available) 1997.

(List continued on next page.)

*Primary Examiner*—Maria Nuzzolillo
*Assistant Examiner*—Carol Chaney
*Attorney, Agent, or Firm*—Alston & Bird LLP

[57] ABSTRACT

The present invention provides a positive electrode material for lithium and lithium-ion secondary cells which exhibits good cycleability, reversible specific capacity, and structural stability. The positive electrode material comprises a lithium multi metal oxide having a spinel structure and described by the general formula:

$$Li_{1+X}Mn_{2-Y}M^1_{m_1}M^2_{m_2}\ldots M^k_{m_k}O_{4+Z}$$

wherein $M^1, M^2, \ldots M^k$ are at least two cations different than lithium or manganese, selected from the group consisting of alkaline earth metals, transition metals, B, Al, Si, Ga and Ge;

X, Y, $m_1, m_2, \ldots m_k$ are numbers between 0 and 0.2;

$m_1, m_2$ and Y are greater than 0;

Z is a number between −0.1 and 0.2; and wherein the metals $M^1, M^2, \ldots M^k$ and the corresponding values $m_1, m_2, \ldots m_k$ satisfy the following equation and inequality:

$$Y = X + m_1 + m_2 + \cdots + m_k$$

and $$3.3 < \frac{m_1 V_1 + m_2 V_2 + \cdots + m_k V_k}{m_1 + m_2 + m_3 + \cdots + m_k} < 3.7$$

wherein $V_1, V_2, \ldots V_k$ are the corresponding valence states of the cations $M^1, M^2, \ldots M^k$.

18 Claims, 2 Drawing Sheets

U.S. PATENT DOCUMENTS

| | | |
|---|---|---|
| 5,084,366 | 1/1992 | Toyoguchi . |
| 5,153,081 | 10/1992 | Thackeray et al. . |
| 5,160,712 | 11/1992 | Thackeray et al. . |
| 5,166,012 | 11/1992 | Rossouw et al. . |
| 5,169,736 | 12/1992 | Bittihn et al. ............................ 429/198 |
| 5,196,278 | 3/1993 | Idota . |
| 5,240,794 | 8/1993 | Thackeray et al. . |
| 5,316,877 | 5/1994 | Thackeray et al. . |
| 5,370,949 | 12/1994 | Davidson et al. . |
| 5,425,932 | 6/1995 | Tarascon . |
| 5,429,890 | 7/1995 | Pynenburg et al. . |
| 5,449,577 | 9/1995 | Dahn et al. . |
| 5,478,671 | 12/1995 | Idota . |
| 5,478,672 | 12/1995 | Mitate . |
| 5,478,673 | 12/1995 | Funatsu . |
| 5,478,674 | 12/1995 | Miyasaka . |
| 5,478,675 | 12/1995 | Nagaura . |
| 5,506,077 | 4/1996 | Koksbang . |
| 5,518,842 | 5/1996 | Fey et al. . |
| 5,595,842 | 1/1997 | Nakane et al. . |
| 5,658,693 | 8/1997 | Thackeray et al. . |
| 5,674,645 | 10/1997 | Amatucci et al. . |
| 5,677,097 | 10/1997 | Amine et al. . |
| 5,679,481 | 10/1997 | Takanishi et al. . |
| 5,718,877 | 2/1998 | Manev et al. . |
| 5,742,070 | 4/1998 | Hayashi et al. ....................... 252/182.1 |
| 5,900,385 | 5/1999 | Dahn et al. ............................. 502/302 |

OTHER PUBLICATIONS

Preparation and Electrochemical Investigation of $LiMn_{1.5}Me_{0.5}O_4$ (Me:Ni,Fe) Cathode Materials for Secondary Lithium Batteries , K. Amine et al., pp. 472–473 1997, no month.

Preparation and Electrochemical Investigation of $LiMn_{2-x}Me_xO_4$ (Me:Ni,Fe, and =0.5, 1) Cathode Materials for Secondary Lithium Batteries, K. Amine et al., Journal of Power Sources 68, 1997, pp. 604–608 (no month).

Ambient and High–Pressure Structures of $LiMnVO_4$ and its $Mn^{3+}/Mn^{2+}$ Redox Energy, A. K. Padhi et al., Journal of Solid State Chemistry 128, 1997, pp. 267–272 (no month).

The Spinel Phase of $LiMn_2O_4$ As a Cathode in Secondary Lithium Cells, J. M. Tarascon et al., J. Electrochem. Soc., vol. 138, No. 10, Oct. 1991, pp. 2859–2864.

Thermal Stability of $Li_xCoO_2$, $Li_xNiO_2$ and $\lambda-MnO_2$ and Consequences for the Safety of Li–Ion Cells, J. R. Dahn et al., Solid State Ionics 69, 1994, pp. 265–270 (no month).

Synthesis and Characterization of $LiAl_{1/4}Ni_{3/4}O_2$ (R3m) for Lithium–Ion (Shuttlecock) Batteries, T. Ohzuku et al., J. Electrochem. Soc., vol. 142, No. 12, Dec., 1995, pp. 4033–4039.

Structure and Electrochemistry of $Li_xMn_yNi_{1-y}O_2$, E. Rossen et al., Solid State Ionics, Elsevier Science Publishers, 1992, pp. 311–318 (no month).

Lithium Manganese Colbalt Spinel Cathode for 4V Lithium Batteries, B. Banov et al., 8th International Meeting on Lithium Batteries, Jun. 1996, Nagoya, Japan, pp. 452–453.

Chemically Desodiated Thiochromites as Cathode Materials in Secondary Lithium Cells, R. Moshtev et al., Journal of Power Sources, 26, 1989, pp. 285–292 no month.

Improved Capacity Retention in Rechargeable 4V Lithium/ Lithium Manganese Oxide (Spinel) Cells, R. J. Gummow et al., Solid State Ionics 69, 1994 no month.

Valence Analysis of Transition Metal Ions in Spinel $LiMnMO_4$ (M=Ti, Cr, Mn, Co) By Electron Energy Loss Spectroscopy, S. Suzuki et al., J. Phys. Chem. Solids vol. 57, No. 12, 1996, pp. 1851–1856 no month.

Doped Li–Mn Spinels: Physical/Chemical Characteristics and Electrochemical Performance in Li Batteries, G. Pistoia et al., Chem. Mater. 9, 1997, pp. 1443–1450 no month.

Structural Aspects of Lithium–Manganese–Oxide Electrodes For Rechargeable Lithium Batteries;M. H. Rossouw et al., *Material Research Bulletin*, vol. 25, No. 2, pp. 173–182, (1990). (no month).

Spinel Electrodes from the Li–Mn–O System for Rechargeable Lithium Battery Applications;M. M. Thackeray et al., J. Electrochem. Soc., vol. 139, No. 2, pp. 363–366, (Feb. 1992).

MULTIPLE-DOPED OXIDE CATHODE MATERIAL FOR SECONDARY LITHIUM AND LITHIUM-ION BATTERIES

CROSS-REFERENCE TO RELATED APPLICATIONS

This application is related to copending provisional application Ser. No. 60/039,666, filed Feb. 28, 1997, and claims the benefit of the earlier filing date of this application under 35 U.S.C. §119 (e)

FIELD OF THE INVENTION

The present invention relates to composite metal oxide positive electrode materials for secondary lithium and lithium-ion batteries.

BACKGROUND OF THE INVENTION

Lithium-manganese spinels are presently considered useful positive electrode materials for 4 V secondary lithium and lithium-ion batteries. However, the stoichiometric spinel $LiMn_2O_4$ exhibits poor cycling performance in comparison to other positive electrode materials used for 4 V batteries. Therefore, there have been numerous methods proposed in the art for increasing the cycling performance of $LiMn_2O_4$.

For example, a portion of the manganese in the $LiMn_2O_4$ spinel can be replaced with excess lithium as proposed in R. J. Gummow et al., Solid State Ionics, 69 (1994), p. 59; and U.S. Pat. No. 5,425,932 to Tarascon. Nevertheless, the stabilization of the $LiMn_2O_4$ structure by doping the spinel with excess lithium to form $Li_{1+x}Mn_{2-x}O_4$ is accompanied by a significant decrease in its specific capacity. This decrease is caused by the fact that each lithium ion in excess of the stoichiometric amount engages 3 $Mn^{3+}$ ions by replacing one of them and changing the valence state of the other two from $3^+$ to $4^+$, thereby significantly reducing the number of manganese ions which can change their valence from $3^+$ to $4^+$ during the charge process.

Another proposed solution has been the replacement of a portion of the manganese ions with another cation as described, e.g., in U.S. Pat. No. 5,169,736 to Bittihn et al.; U.S. Pat. No. 5,478,674 to Miyasaka; EP 0744381; DE 4,435,117; GB 2,270,195; U.S. Pat. No. 5,677,087 to Amine et al.; and the Gummow et al. article, supra. Although the spinels substituted with cations other than lithium tend to show better capacity retention for the cathode material, there is still a substantial decrease in the specific capacity. This is typically due to the fact that the doping ion replaces a $3^+$ manganese ion, but cannot itself be transferred to $4^+$ during the charge process (e.g. $Ni^{2+}$, $Co^{3+}$, $Cr^{3+}$ and $Al^{3+}$), or it replaces a lithium ion in its tetrahedral site reducing the number of lithium ions which can be reversibly intercalated in the 4 V range (e.g. $Fe^{3+}$, $Ga^{3+}$, $Ti^{4+}$ and $V^{5+}$).

Other solutions have also been proposed. For example, U.S. Pat. No. 5,674,645 to Amatucci et al. proposes replacing a portion of the oxygen with other anions. Alternatively, U.S. Pat. No. 5,429,890 to Pynenberg et al. and U.S. Pat. No. 5,478,675 to Nagaura have proposed a composite physical mixture of $LiMn_2O_4$ with other metal oxides. However, these methods have not provided the cycleability, specific capacity and structural stability desired in the art.

SUMMARY OF THE INVENTION

It has been discovered that a certain combination of codoping ions simultaneously introduced into the spinel structure can lead to considerable improvement in the capacity retention, i.e., cycleability, of the positive electrode material for secondary lithium and lithium-ion batteries without a significant decrease in its specific capacity. Structurally stable codoped lithium metal oxides can be prepared in accordance with the invention which have both the cycleability and the reversible specific capacity desired in the art.

The present invention provides a positive electrode material for secondary lithium and lithium-ion cells which comprises a multiple-doped lithium manganese metal oxide having a spinel structure and described by the general formula:

wherein $M^1$, $M^2$, ... $M^k$ are at least two cations different than lithium or manganese, selected from the group consisting of alkali metals alkaline earth metals, transition metals, B, Al, Si, Ga and Ge;

X, Y, $m_1$, $m_2$, ... $m_k$ are molar parts with numbers between 0 and 0.2;

$m_1$, $m_2$ and Y are greater than 0;

Z is a number between $-0.1$ and 0.2; and wherein the metals $M^1$, $M^2$, ... $M^k$ and the corresponding molar parts $m_1$, $m_2$, ... $m_k$ satisfy the following equation and inequality:

$$Y = X + m_1 + m_2 + \cdots + m_k$$

and $$3.3 < \frac{m_1 V_1 + m_2 V_2 + \cdots + m_k V_k}{m_1 + m_2 + m_3 + \cdots + m_k} < 3.7$$

wherein $V_1$, $V_2$, ... $V_k$ are the corresponding valence states of the cations $M^1$, $M^2$, ... $M^k$.

More preferably, the cations $M^1$, $M^2$, ... $M^k$ and the corresponding molar parts $m_1$, $m_2$, ... $m_k$ satisfy the following two equations:

$$Y = X + m_1 + m_2 + \cdots + m_k$$

$$\frac{m_1 V_1 + m_2 V_2 + \cdots + m_k V_k}{m_1 + m_2 + m_3 + \cdots + m_k} = 3.5$$

Furthermore, the codopants in the multiple-doped lithium manganese oxide spinel compounds of the invention preferably do not cause significant contraction or expansion of the spinel structure. Specifically, the unit cell parameter (a) of the multiple-doped lithium manganese metal oxide of the invention is preferably within about ±0.0015 Å, more preferably ±0.0005 Å, of the unit cell parameter (a) of the corresponding unsubstituted $Li_{1+x}Mn_{2-x}O_{4+z}$ spinel.

In a particularly preferred embodiment of the invention, the spinel compound is codoped with equivalent amounts of $Co^{3+}$ and $Ti^{4+}$ to form a spinel material having a composition described by the formula:

wherein X and m are molar parts with numbers between 0 and 0.2 and Z is a number between $-0.1$ and 0.2.

These and other features and advantages of the present invention will become more readily apparent to those skilled in the art upon consideration of the following detailed description and accompanying drawings which describe both the preferred and alternative embodiments of the present invention.

DETAILED DESCRIPTION OF THE PREFERRED EMBODIMENTS

Figure 1:
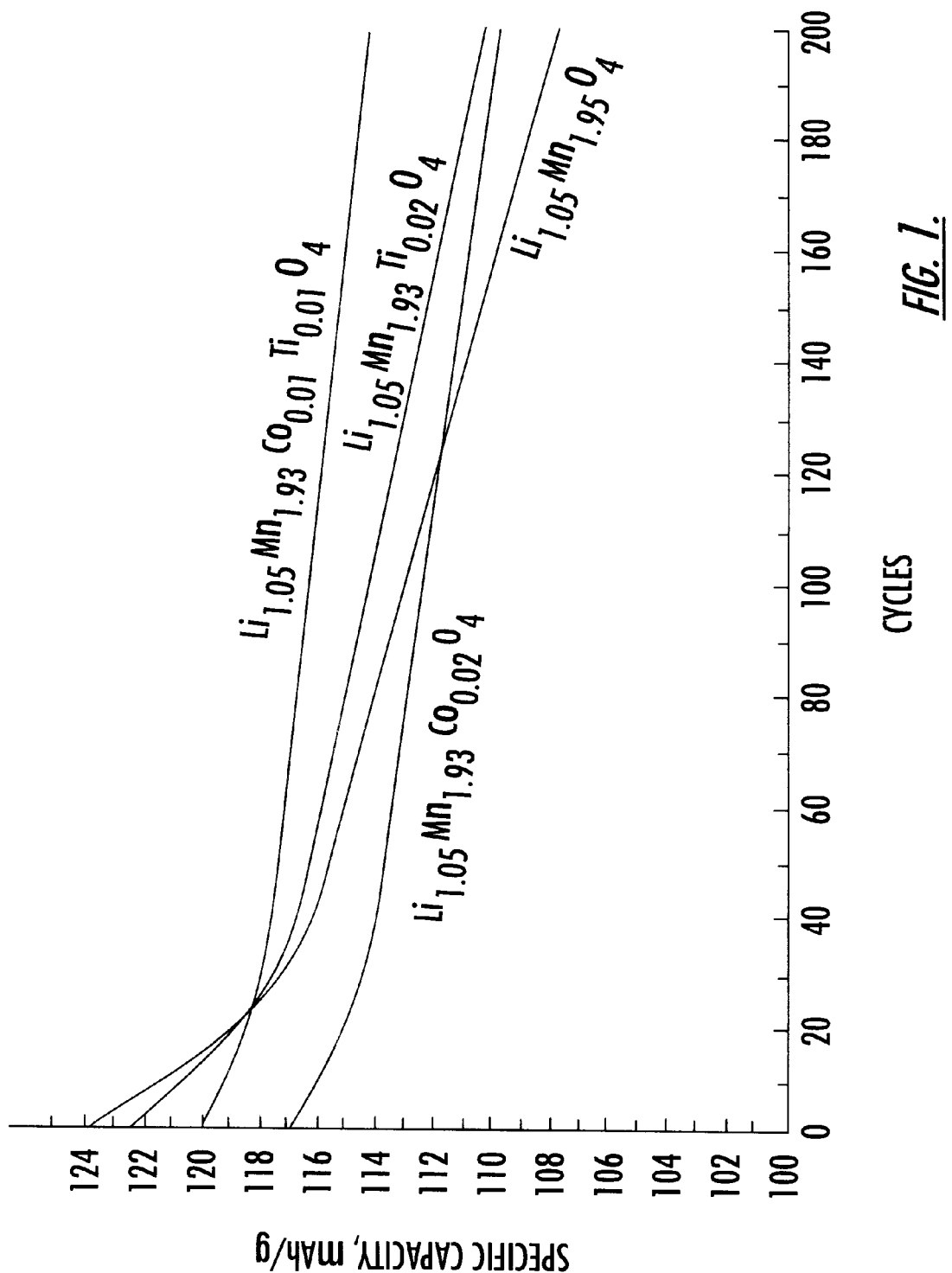
FIG. 1 is a graph showing the discharge specific capacity versus cycle number for a secondary lithium cell with a positive electrode material prepared in accordance with the present invention, and for secondary lithium cells having alternative positive electrode materials, wherein the excess lithium is the same for all examples.

In the drawings and the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description and accompanying drawings.

The present invention is directed to improvements in the electrochemical performance of the secondary lithium and lithium-ion cells resulting from the use of a multiple-doped lithium manganese spinel as the positive electrode material. In particular, it has been discovered that the electrical performance of a stoichiometric lithium manganese oxide spinel $Li_{1+X}Mn_{2-X}O_{4+Z}$ can be improved by replacing a portion of the manganese with a combination of two or more cations other than lithium or manganese. In addition, a portion of the manganese can be replaced with excess lithium ions in the spinel to improve the electrical performance of the $Li_{1+X}Mn_{2-X}O_{4+Z}$ spinel.

In accordance with the invention, the multiple-doped lithium manganese oxide has a spinel structure and can be described by the general formula:

$$Li_{1+X}Mn_{2-Y}M^1_{m_1}M^2_{m_2}\ldots M^k_{m_k}O_{4+Z}$$

wherein $M^1, M^2, \ldots M^k$ are at least two cations different than lithium or manganese, selected from the group consisting of alkali metals alkaline earth metals, transition metals, B, Al, Si, Ga and Ge;

X, Y, $m_1, m_2, \ldots m_k$ are molar parts with numbers between 0 and 0.2;

Z is a number between −0.1 and 0.2; and wherein the metals $M^1, M^2, \ldots M^k$ and the corresponding molar parts $m_1, m_2, \ldots m_k$ satisfy the following equation and inequality:

$$Y = X + m_1 + m_2 + \cdots + m_k$$

and $$3.3 < \frac{m_1 V_1 + m_2 V_2 + \cdots + m_k V_k}{m_1 + m_2 + m_3 + \cdots + m_k} < 3.7$$

wherein $V_1, V_2, \ldots V_k$ are the corresponding valence states of the cations $M^1, M^2, \ldots M^k$.

It has been determined in accordance with the invention that to maintain the desired structural stability of the spinel structure of the invention, the molar portion of replaced manganese equals the molar amount of codopants and the excess lithium, i.e., $Y=X+m_1+m_2+\ldots+m_k$. As will be readily understood by those skilled in the art, because the present invention replaces a portion of the manganese with a combination of two or more cations other than lithium or manganese, $m_1$ and $m_2$ are greater than 0 and therefore Y is also greater than 0 in accordance with the invention.

In addition, as described above, in the multiple-doped lithium manganese oxide spinels of the invention, the mean valency of the codopants satisfies the relationship:

$$3.3 < \frac{m_1 V_1 + m_2 V_2 + \cdots + m_k V_k}{m_1 + m_2 + m_3 + \cdots + m_k} < 3.7$$

wherein $V_1, V_2, \ldots V_k$ are the corresponding valence states of the cations $M^1, M^2, \ldots M^k$. More preferably, $$\frac{m_1 V_1 + m_2 V_2 + \cdots + m_k V_k}{m_1 + m_2 + m_3 + \cdots + m_k} = 3.5$$

Therefore, the mean valency state of the substituted ions are equal or nearly equal to the mean valency state of the manganese ions in the corresponding unsubstituted spinel compound.

In a particularly preferred embodiment of the invention, the $Li_{1+X}Mn_{2-X}O_{4+Z}$ spinel compound is codoped with $Co^{3+}$ and $Ti^{4+}$ to form the spinel material. Preferably, in order for the dopants to achieve an overall valency of 3.5, the molar amounts of $Co^{3+}$ and $Ti^{4+}$ are equivalent. In addition, a portion of the manganese can also be replaced by excess lithium. In this preferred embodiment, the composition can be described by the formula:

$$Li_{1+X}Mn_{2-X-2m}Co_m^{3+}Ti_m^{4+}O_{4+Z}$$

wherein X and m are molar parts with numbers between 0 and 0.2 and Z is a number between −0.1 and 0.2.

Although the codopant combination of cobalt and titanium is described as a preferred embodiment for use in the invention, various other combinations can be used in accordance with the invention. For example, combinations of aluminum, cobalt, chromium, copper, iron, gallium, magnesium, nickel, germanium, molybdenum, niobium, titanium, vanadium and tungsten such as aluminum/titanium, gallium/titanium, nickel/titanium, iron/titanium, chromium/titanium, cobalt/vanadium, aluminum/vanadium, magnesium/vanadium, gallium/vanadium, nickel/vanadium, iron/vanadium, chromium/vanadium, cobalt/molybdenum, aluminum/molybdenum, gallium/molybdenum, nickel/molybdenum, iron/molybdenum, chromium/molybdenum, cobalt/germanium, aluminum/germanium, magnesium/germanium, gallium/germanium, nickel/germanium, iron/germanium, chromium/germanium, cobalt/nickel/vanadium, magnesium/germanium/vanadium, aluminum/cobalt/titanium, aluminum/titanium/molybdenum, aluminum/cobalt/molybdenum, nickel/titanium/molybdenum, cobalt/nickel/titanium/vanadium, cobalt/nickel/titanium/molybdenum, and cobalt/nickel/aluminum/titanium/vanadium, can be used to produce multiple doped lithium manganese oxide spinels which meet the above formula in accordance with the invention.

Furthermore, the codopants in the multiple-doped lithium manganese oxide spinel compounds of the invention are preferably selected not to cause significant contraction or expansion of the spinel structure. Therefore, the codopants typically have a mean ionic radii size ($R_r$) which corresponds to the mean ionic radii size of the manganese ions being replaced. Preferably, the unit cell parameter (a) of the multiple-doped lithium manganese oxide spinel compound is within ±0.0015 Å, more preferably within about ±0.0005 Å, of the unit cell parameter of the corresponding unsubstituted $Li_{1+X}Mn_{2-X}O_{4+Z}$ spinel (i.e., wherein $m_1$, $m_2$, ... $m_k$=0). Stated differently, introducing the codopants into the lithium manganese oxide spinel causes an increase or decrease in the unit cell parameter of the spinel of less than or equal to about 0.0015 Å, more preferably, less than or equal to about ±0.0005 Å. The unit cell parameter (a) of the spinel structure can be readily determined by x-ray diffraction analysis using $CuK\alpha_1$ rays or other rays as would be understood by those skilled in the art.

For example, in the preferred embodiment described above, $Co^{3+}$ ions have an ionic radii of 0.55 Å and replace $Mn^{3+}$ ions which have a higher ionic radii size of about 0.62 Å. Therefore, the replacement of $Mn^{3+}$ ions with $Co^{3+}$ ions in the spinel structure causes a corresponding decrease in the unit cell parameter. In contrast, $Ti^{4+}$ ions have an ionic radii size of 0.68 Å and replace $Mn^{4+}$ ions which have a smaller ionic radii size of about 0.54 Å thereby causing an increase in the unit cell parameter. However, because the mean radii size of the $Co^{3+}$ and $Ti^{4+}$ ions when used in equal amounts is close to the mean radii size of the $Mn^{3+}$ and $Mn^{4+}$ ions in the spinel, the introduction of equal amounts of $Co^{3+}$ and $Ti^{4+}$ in the spinel structure does not cause significant changes in the unit cell parameter of the spinel. As a result, doping the spinel structure with equal amounts of $Co^{3+}$ and $Ti^{4+}$ ions considerably decreases the lattice distortion caused by the different geometric sizes of these ions in the spinel structure. This can be demonstrated by comparing the unit cell parameters of a single cobalt-doped spinel compound and the multiple-doped spinel compound of the preferred embodiment using x-ray diffraction analysis. When small amounts (e.g., molar amounts of about 0.01) of $Co^{3+}$ ions replace $Mn^{3+}$ ions in the spinel structure, there is an decrease in the unit cell parameter of about 0.005 Å. However, when $Co^{3+}$ and $Ti^{4+}$ are introduced in equivalent amounts, the decrease in the unit cell parameter is only about 0.001 Å as desired in the invention.

In addition to the above, the doped ions used in the spinel of the invention are preferably selected such that not all of the doped ions occupy the same sites (e.g. octahedral and tetrahedral sites) in the spinel structure. For example, in the preferred embodiment described above, the $Co^{3+}$ ions generally occupy octahedral sites and the majority of the $Ti^{4+}$ ions occupy tetrahedral sites when included in the spinel structure. Other ion combinations, e.g., $Ni^{2+}$ and $V^{5+}$, can also occupy different positions in the spinel structure as preferred in accordance with the invention.

The present invention also includes a method of preparing a multiple-doped lithium manganese oxide spinel compound as described above. Specifically, source compounds (i.e. raw materials) containing lithium, manganese, oxygen, and the dopants ($M^1$, $M^2$, ... $M^k$) are mixed to provide the formula:

$$Li_{1+X}Mn_{2-Y}M^1_{m_1}M^2_{m_2} \ldots M^k_{m_k}O_{4+Z}$$

wherein X, Y, $m_1$, $m_2$, ... $m_k$ are molar parts with numbers between 0 and 0.2; ml, $m_2$ and Y are greater than 0; Z is a number between −0.1 and 0.2; and the metals $M^1$, $M^2$, ... $M^k$ and the corresponding molar parts $m_1$, $m_2$, ... $m_k$ are selected to satisfy the equation and inequality:

$$Y = X + m_1 + m_2 + \cdots + m_k$$

and $$3.3 < \frac{m_1 V_1 + m_2 V_2 + \cdots + m_k V_k}{m_1 + m_2 + m_3 + \cdots + m_k} < 3.7$$

wherein $V_1$, $V_2$, ... $V_k$ are the corresponding valence states of the cations $M^1$, $M^2$, ... $M^k$. In addition, the cations can be selected to correspond to the ionic radii size of the manganese being replaced as discussed in more detail above.

The source compounds for preparing the multiple-doped lithium manganese metal oxides of the invention can be pure elements but are typically compounds containing these elements such as oxides, salts or complexes thereof. In addition, the cations for the multiple-doped spinel compound can each be supplied from separate source compounds or two or more of the cations can be supplied from the same source compound. In either case, it is important that the source compounds have high purity to limit the amount of defects in the spinel compound.

The source compounds can be mixed in any desirable order to provide the desired elements for the multiple-doped lithium manganese oxide spinels of the invention. Preferably, the source compounds are mixed using wet chemistry such as sol-gel type reactions, coprecipitation, and other methods. In one preferred example, the non-lithium source compounds are mixed together in aqueous solution to evenly distribute the source compounds and the resulting mixture is precipitated out of solution for later mixture with the lithium source compound. For example, to prepare the preferred embodiment described above, $MnCO_3$, $(CH_3CO_2)_2Co.4H_2O$ and $[CH_3CH(O)CO_2NH_4]_2Ti(OH)_2$ can be coprecipitated together and then mixed with LiOH to provide the desired elements. Alternatively, the source compounds used in the invention can be mixed using dry methods. As will be understood by those skilled in the art, the selection of mixing methods will vary depending on the source compounds used and the desired end product. In any event, the source compounds are preferably sufficiently mixed to provide an even distribution of the metals in the mixture. It has been discovered in accordance with the invention that the even distribution of the metals produces a more homogenous and structurally stable spinel compound.

The mixture once prepared can be reacted by a solid state reaction to form the multiple-doped lithium manganese oxide spinel compounds of the invention. Preferably, the mixture is reacted by firing the mixture at an elevated temperature between about 400° C. and about 900° C. in the presence of oxygen, e.g., in an atmosphere with a partial pressure of oxygen of at least 20 kPa. The mixture can be fired in one step but is preferably fired in more than one step to produce the spinel compound. Preferably, the mixture is fired at a temperature between about 400° C. and about 500° C. for 1 to 24 hours, at a temperature between about 500° C. and about 600° C. for 1 to 24 hours, and at a temperature of between about 700° C. and about 900° C. for 1 to 24 hours. Additional firing steps can also be used in the invention to improve the quality of the resulting spinel as described, e.g., in U.S. Pat. No. 5,718,877, which is hereby incorporated in its entirety by reference. Once the mixture has been fired to form the multiple-doped lithium manganese oxide spinel compound, this compound is preferably cooled to ambient temperature in a controlled manner, e.g., at a rate of 5° C./min or less, to produce a spinel compound suitable for use as a positive electrode material for secondary lithium and lithium-ion batteries.

The multiple-doped lithium manganese oxide spinel compounds can be used in positive electrodes in secondary lithium and lithium-ion cells. The multiple-doped lithium manganese oxide spinel is typically combined with a conductive agent such as graphite or carbon black and a binder material such as polyvinylidene difluoride (PVDF) and dispersed in a solvent such as n-methyl pyrrolidinone (NMP) (e.g. 1-methyl-2-pyrrolidinone) to form a slurry. The slurry is typically spread on aluminum and then heated to evaporate the solvent to form a dry electrode material. The dry electrode is then compressed by rolling, pressing, or other known methods, and cut into, for example, a disk, to form the positive electrode. The electrode is then placed inside an secondary lithium or lithium-ion cell with a lithium counterelectrode and an electrolyte such as $EC:DMC/LiPF_6$.

The present invention will now be further described by the following non-limiting examples.

EXAMPLE 1

A spinel $Li_{1+x}Mn_{2-x-2m}Co_m^{3+}Ti_m^{4+}O_{4+z}$ compound with X=0.05 and m=0.01 was prepared in a solid state reaction from LiOH, $MnCO_3$, $(CH_3CO_2)_2Co.4H_2O$ and $[CH_3CH(O)CO_2NH_4]_2Ti(OH)_2$ in a mole ratio of 1.05:1.93:0.01:0.01 by firing a mixture of these compounds at 450° C. for 6 hours, 550° C. for 6 hours, 750° C. for 6 hours, 825° C. for 24 hours, and 725° C. for 6 hours. The heated mixture was then cooled to ambient temperature at a rate of 100° C./hr. The stoichiometry of the resulting multiple oxide compound was $Li_{1.05}Mn_{1.93}Co_{0.01}Ti_{0.01}O_4$.

The prepared multiple oxide spinel compound $Li_{1.05}Mn_{1.93}Co_{0.01}Ti_{0.01}O_4$ was then mixed with 10% graphite and a 5% PVDF binder dissolved in n-methyl pyrrolidinone (NMP) solvent to form a slurry. The slurry was spread on aluminum foil and then heated to evaporate the solvent. The dry electrode was then pressed at 500 kg/cm$^2$ and cut into a disk test sample electrode having a diameter of about 1 cm and a thickness of about 0.015 cm. The prepared test electrode was placed inside an electrochemical cell with a lithium counter electrode and with an $EC:DMC/LiPF_6$ electrolyte and a charging-discharging test was carried out at a 1 h charge/discharge rate and 3–4.5 V voltage limits.

EXAMPLE 2

A spinel $Li_{1+x}Mn_{2-x-2m}Co_m^{3+}Ti_m^{4+}O_{4+z}$ compound with X=0.03 and m=0.01 was prepared in a solid state reaction from LiOH, $MnCO_3$, $(CH_3CO_2)_2Co.4H_2O$ and $[CH_3CH(O)CO_2NH_4]_2Ti(OH)_2$ in a mole ratio of 1.03:1.95:0.01:0.01 by firing a mixture of these compounds at 450° C. for 6 hours, 550° C. for 6 hours, 750° C. for 6 hours, 825° C. for 24 hours, and 725° C. for 6 hours. The heated mixture was then cooled to ambient temperature at a rate of 100° C./hr. The stoichiometry of the resulting multiple oxide compound was $Li_{1.03}Mn_{1.95}Co_{0.01}Ti_{0.01}O_4$.

A spinel $Li_{1.03}Mn_{1.95}Co_{0.01}Ti_{0.01}O_4$ positive test electrode was prepared and an electrochemical cell assembled in the same manner as in Example 1. The cell charge/discharge characteristics were then measured under the same conditions as Example 1.

COMPARATIVE EXAMPLE 1

A spinel $Li_{1+x}Mn_{2-x-m}Co_m^{3+}O_{4+z}$ compound with X=0.05 and m=0.02 was prepared in a solid state reaction from LiOH, $MnCO_3$, and $(CH_3CO_2)_2Co.4H_2O$ in a mole ratio of 1.05:1.93:0.02 by firing a mixture of these compounds at 450° C. for 6 hours, 550° C. for 6 hours, 750° C. for 6 hours, 825° C. for 24 hours, and 725° C. for 6 hours. The heated mixture was then cooled to ambient temperature at a rate of 100° C./hr. The stoichiometry of the resulting multiple oxide compound was $Li_{1.05}Mn_{1.93}Co_{0.02}O_4$.

A spinel $Li_{1.05}Mn_{1.93}Co_{0.02}O_4$ positive test electrode was prepared and the electrochemical cell assembled in the same manner as in Example 1. The cell charge/discharge characteristics were then measured under the same conditions as Example 1.

COMPARATIVE EXAMPLE 2

A spinel $Li_{1+x}Mn_{2-x-m}Ti_m^{4+}O_4$ compound with X=0.05 and m=0.02 was prepared in a solid state reaction from LiOH, $MnCO_3$, and $[CH_3CH(O)CO_2NH_4]_2Ti(OH)_2$ in a mole ratio of 1.05:1.93:0.02 by firing a mixture of these compounds at 450° C. for 6 hours, 550° C. for 6 hours, 750° C. for 6 hours, 825° C. for 24 hours, and 725° C. for 6 hours. The heated mixture was then cooled to ambient temperature at a rate of 100° C./hr. The stoichiometry of the resulting multiple oxide compound was $Li_{1.05}M_{1.93}Ti_{0.02}O_4$.

A spinel $Li_{1.05}Mn_{1.93}Ti_{0.02}O_4$ positive test electrode was prepared and an electrochemical cell assembled in the same manner as in Example 1. The cell charge/discharge characteristics were then measured under the same conditions as Example 1.

COMPARATIVE EXAMPLE 3

A spinel $Li_{1+x}Mn_{2-x}O_4$ compound with X=0.05 was prepared in a solid state reaction from LiOH and $MnCO_3$, in a mole ratio of 1.05:1.95 by firing a mixture of these compounds at 450° C. for 6 hours, 550° C. for 6 hours, 750° C. for 6 hours, 825° C. for 24 hours, and 725° C. for 6 hours. The heated mixture was then cooled to ambient temperature at a rate of 100° C./hr. The stoichiometry of thus obtained multiple oxide compound was $Li_{1.05}Mn_{1.95}O_4$.

A spinel $Li_{1.05}Mn_{1.95}O_4$ positive test electrode was prepared and an electrochemical cell assembled in the same manner as in Example 1. The cell charge/discharge characteristics were then measured under the same conditions as Example 1.

FIG. 1 illustrates the specific capacity versus cycle number for the cell prepared according to Example 1 and the cells prepared according to Comparative Examples 1, 2 and 3. As demonstrated in FIG. 1, the undoped spinel has a good initial specific capacity but considerable capacity loss or capacity fade. The titanium-doped spinel exhibits a slight improvement in capacity loss compared to the undoped spinel at the expense of a small decrease in specific capacity. The cobalt-doped spinel compound demonstrates a significant improvement in capacity fade over the undoped spinel but also has a significant decrease in initial specific capacity. The spinel produced in accordance with the invention, as shown in FIG. 1, exhibits superior capacity fade without significant loss of initial specific capacity. This result would not be expected based on the initial specific capacity and cycling performance of the single-doped compounds as shown in FIG. 1. In particular, it would be expected that the combined improvement in cycleability based on the addition of both the $Ti^{4+}$ and $Co^{3+}$ ions would be associated with a combined decrease in initial specific capacity based on the addition of both of these ions. Nevertheless, this is not the case. Therefore, it has been discovered in accordance with the invention, that the use of multiple dopants can provide benefits to the $Li_{1+x}Mn_{2-x}O_4$ spinel not readily predicted based on the electrical performance of the single-doped spinels.

Figure 2:
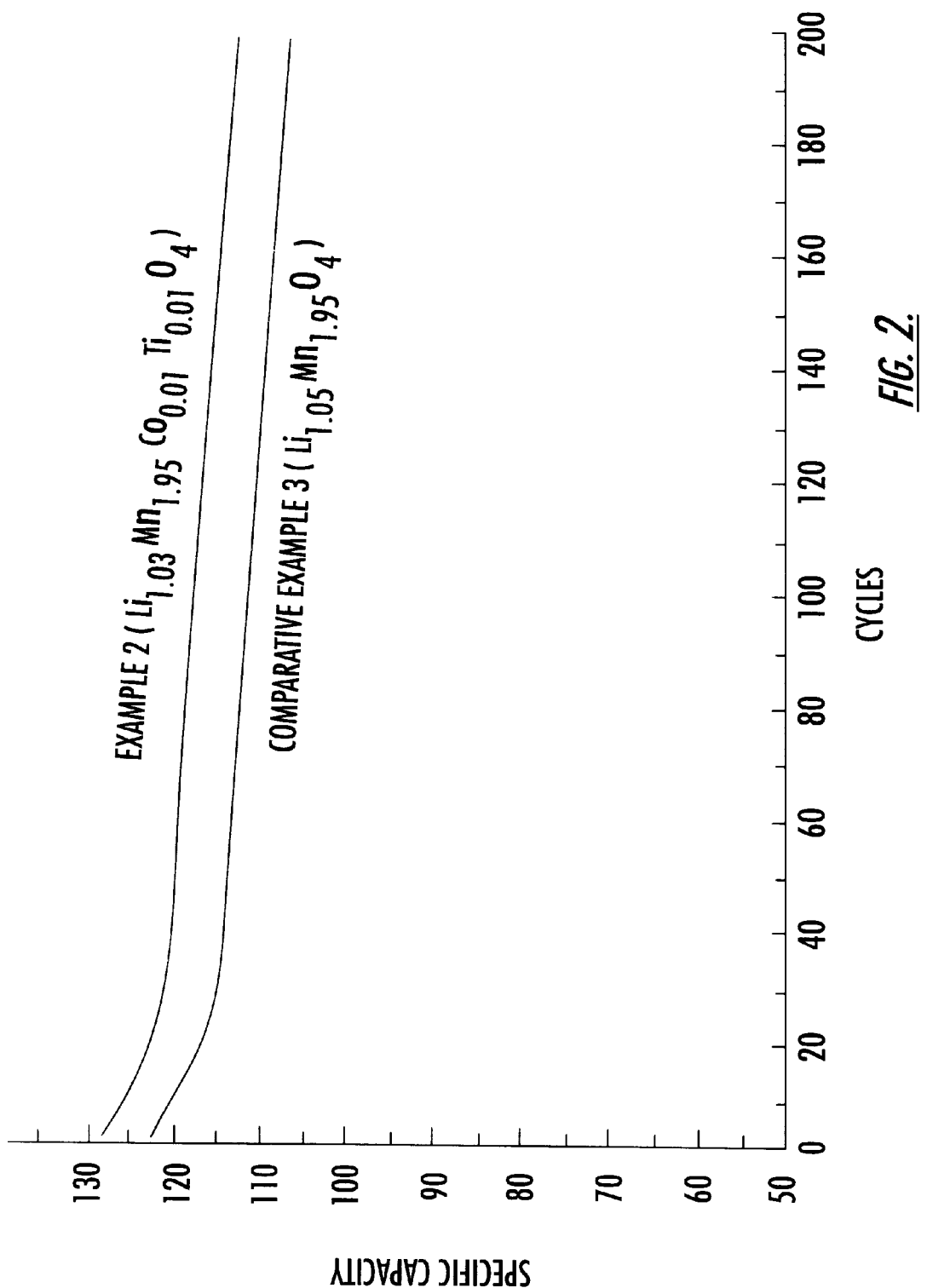
FIG. 2 is a graph showing the discharge specific capacity versus cycle number for a secondary lithium cell with a positive electrode material prepared in accordance with the present invention, and for secondary lithium cells having alternative positive electrode materials, wherein the sum of the molar parts of the excess lithium and the codopants is the same for all examples.

FIG. 2 further illustrates the advantages of the multiple-doped lithium manganese oxide spinel compounds of the invention. Specifically, FIG. 2 illustrates the specific capacity versus cycle number for the cell prepared according to Example 2 and the cell prepared according to Comparative Example 3. As shown in FIG. 2, the substitution of excess lithium in the spinel compound with equivalent amounts of $Co^{3+}$ and $Ti^{4+}$ cations can cause a substantial increase in the initial specific capacity without negatively affecting the capacity fade or cycleability of the spinel. Therefore, the addition of codopants can be used in combination with excess lithium or in place of excess lithium in the spinel compounds to benefit the electrical performance of the spinel.

The multiple-doped lithium manganese oxide spinels of the invention exhibit increased cycleability and reversible capacity over unsubstituted $Li_{1+x}Mn_{2-x}O_4$ spinels. For the multiple-doped lithium manganese oxide spinels produced in accordance with the invention, in order to achieve an increase in cycleability without a corresponding significant decrease in specific capacity it has been found particularly important to have the combination of the valency state of the dopants, the position of the doped ions in the spinel structure, and the ionic radii size of the dopants described above.

It is understood that upon reading the above description of the present invention and reviewing the accompanying drawings, one skilled in the art could make changes and variations therefrom. These changes and variations are included in the spirit and scope of the following appended claims.

That which is claimed:

1. A positive electrode for secondary lithium and lithium-ion batteries comprising a multiple-doped lithium manganese metal oxide with a spinel structure and described by the general formula:

$$Li_{1+X}Mn_{2-Y}M^1_{m_1}M^2_{m_2}\ldots M^k_{m_k}O_{4+Z}$$

wherein $M^1, M^2, \ldots M^k$ are at least two different cations other than lithium or manganese, selected from the group consisting of alkali metals, alkaline earth metals, transition metals, B, Al, Si, Ga and Ge;

X, Y, $m_1, m_2, \ldots m_k$ are between 0 and 0.2;

$m_1, m_2$ and Y are greater than 0;

Z is a number between −0.1 and 0.2; and wherein $m_1, m_2, \ldots m_k$ satisfy the following equation and inequality:

$$Y = X + m_1 + m_2 + \cdots + m_k$$

and $$3.3 < \frac{m_1 V_1 + m_2 V_2 + \cdots + m_k V_k}{m_1 + m_2 + m_3 + \cdots + m_k} < 3.7$$

wherein $V_1, V_2, \ldots V_k$ are the corresponding valence states of the cations $M^1, M^2, \ldots M^k$.

2. The positive electrode according to claim 1, said metal oxide satisfying the following relationship:

$$\frac{m_1 V_1 + m_2 V_2 + \cdots + m_k V_k}{m_1 + m_2 + m_3 + \cdots + m_k} = 3.5$$

wherein $V_1, V_2, \ldots V_k$ are the corresponding valence states of the cations $M^1, M^2, \ldots M^k$.

3. The positive electrode according to claim 1 wherein $M^1$ is Co and $M^2$ is Ti.

4. The positive electrode according to claim 3 wherein $m_1 = m_2$.

5. The positive electrode according to claim 1 wherein the unit cell parameter (a) of the multiple-doped lithium manganese metal oxide is within about ±0.0015 Å of the unit cell parameter (a) of the corresponding unsubstituted $Li_{1+x}Mn_{2-x}O_4$ spinel.

6. The positive electrode according to claim 1 wherein the unit cell parameter (a) of the multiple-doped lithium manganese metal oxide is within about ±0.0005 Å of the unit cell parameter (a) of the corresponding unsubstituted $Li_{1+x}Mn_{2-x}O_4$ spinel.

7. The positive electrode according to claim 1 wherein $M^1, M^2, \ldots M^k$ are selected from the group consisting of aluminum, cobalt, chromium, copper, iron, gallium, magnesium, nickel, germanium, molybdenum, niobium, titanium, vanadium and tungsten.

8. A positive electrode for secondary lithium and lithium-ion batteries comprising a multiple-doped lithium manganese metal oxide material with a spinel structure and a composition described by the formula:

$$Li_{1+X}Mn_{2-X-2m}Co_m^{3+}Ti_m^{4+}O_{4+Z}$$

wherein X and m are between 0 and 0.2 and Z is between −0.1 and 0.2.

9. A multiple-doped lithium manganese metal oxide having a spinel structure and described by the general formula:

$$Li_{1+X}Mn_{2-Y}M^1_{m_1}M^2_{m_2}\ldots M^k_{m_k}O_{4+Z}$$

wherein $M^1, M^2, \ldots M^k$ are at least two different cations other than lithium or manganese, selected from the group consisting of alkali metals, alkaline earth metals, transition metals, B, Al, Si, Ga and Ge;

X, Y, $m_1, m_2, \ldots m_k$ are between 0 and 0.2;

$m_1, m_2$ and Y are greater than 0;

Z is a number between −0.1 and 0.2; and wherein $m_1, m_2, \ldots m_k$ satisfy the following equation and inequality:

$$Y = X + m_1 + m_2 + \cdots + m_k$$

and $$3.3 < \frac{m_1 V_1 + m_2 V_2 + \cdots + m_k V_k}{m_1 + m_2 + m_3 + \cdots + m_k} < 3.7$$

wherein $V_1, V_2, \ldots V_k$ are the corresponding valence states of the cations $M^1, M^2, \ldots M^k$.

10. The metal oxide according to claim 9 satisfying the following relationship:

$$\frac{m_1 V_1 + m_2 V_2 + \cdots + m_k V_k}{m_1 + m_2 + m_3 + \cdots + m_k} = 3.5$$

wherein $V_1, V_2, \ldots V_k$ are the corresponding valence states of the cations $M^1, M^2, \ldots M^k$.

11. The metal oxide according to claim 9 wherein $M^1$ is Co and $M^2$ is Ti.

12. The metal oxide according to claim 11 wherein $m_1 = m_2$.

13. The metal oxide according to claim 9 having a unit cell parameter (a) within about ±0.0015 Å of the unit cell parameter of the corresponding unsubstituted $Li_{1+x}Mn_{2-x}O_4$ spinel.

14. The metal oxide according to claim 9 having a unit cell parameter (a) within about ±0.0005 Å of the unit cell parameter of the corresponding unsubstituted $Li_{1+x}Mn_{2-x}O_4$ spinel.

15. The metal oxide according to claim 9 wherein $M^1$, $M^2, \ldots M^k$ are selected from the group consisting of aluminum, cobalt, chromium, copper, iron, gallium, magnesium, nickel, germanium, molybdenum, niobium, titanium, vanadium and tungsten.

16. A multiple-doped lithium manganese metal oxide with a spinel structure and described by the formula:

$$Li_{1+X}Mn_{2-X-2m}Co_m^{3+}Ti_m^{4+}O_{4+Z}$$

wherein X and m are between 0 and 0.2 and Z is between −0.1 and 0.2.

17. The positive electrode according to claim 1, wherein $M^1, M^2, \ldots M^k$ in said metal oxide are selected from the group consisting of alkaline earth metals, transition metals, B, Al, Si, Ga and Ge.

18. The metal oxide according to claim 9, wherein $M^1, M^2, \ldots M^k$ are selected from the group consisting of alkaline earth metals, transition metals, B, Al, Si, Ga and Ge.

* * * * *

UNITED STATES PATENT AND TRADEMARK OFFICE
CERTIFICATE OF CORRECTION

PATENT NO. : 6,040,089
DATED : March 21, 2000
INVENTOR(S) : Manev et al.

It is certified that error appears in the above-identified patent and that said Letters Patent is hereby corrected as shown below:

Title page,

Item [56] References Cited, U.S. PATENT DOCUMENTS,
Page 2, Column 1,
Line 23, "5,677,097 should read --5,677,087--.

Item [56] References Cited, OTHER PUBLICATIONS,
Page 2, Column 1,
Line 6, before "=" insert --X--.

Signed and Sealed this

Nineteenth Day of June, 2001

*Attest:*

*Attesting Officer*

NICHOLAS P. GODICI
*Acting Director of the United States Patent and Trademark Office*